United States Patent Office 2,871,890
Patented Feb. 3, 1959

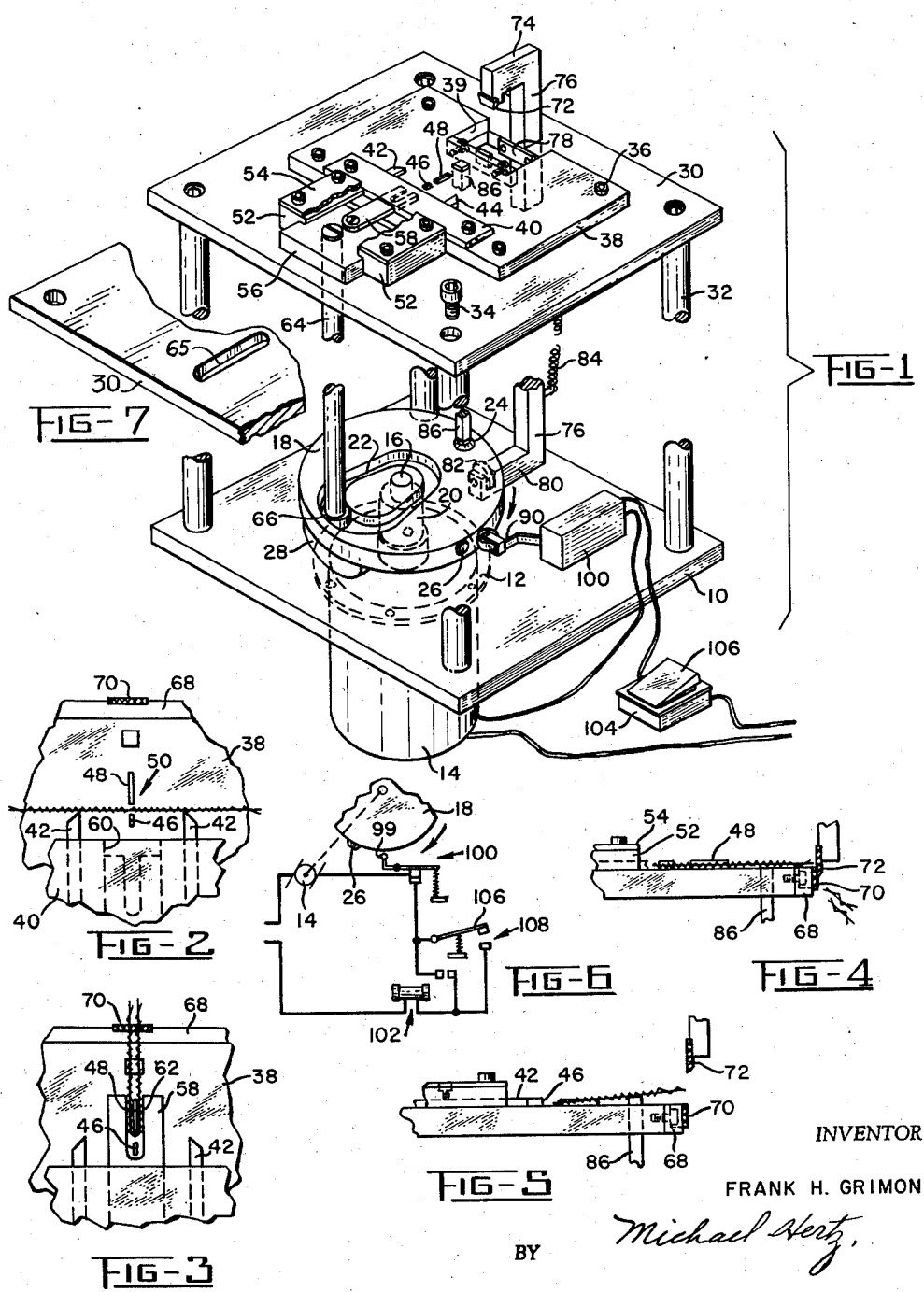

2,871,890

HAIR PIN HEATER, FORMER AND CUTTER

Frank H. Grimone, Emporium, Pa., assignor to Sylvania Electric Products Inc., a corporation of Massachusetts Application April 5, 1957, Serial No. 651,023

3 Claims. (Cl. 140—71)

This invention relates to machines for shaping and cutting of wires to proper length, such for example as are to be utilized in electron tubes as cathode heaters or filamentary cathodes.

Hereto such operations were performed by hand fixtures which were slow and inaccurate.

An object of the invention is to provide a machine which shall automatically form a wire, and which may be a coiled wire, into a hairpin shape, and cut off the legs of the wire to a given length. It is a further object of the invention to provide means whereby at the end of the forming and cutting operation, the wire will be partially displaced from the machine to facilitate grasping of the wire by an operator for easy removal thereof from the machine. Still another object of the invention is to provide means whereby the forming and cutting machine will automatically complete a single cycle of operation after an initiation of the cycle by the operator. These and other objects will become apparent after consideration of the following specification when taken in conjunction with the accompanying drawing, in which Fig. 1 is an exploded perspective view of the wire handling mechanism.

Fig. 2 is a detail showing guide mechanism on the machine with respect to which a wire is initially laid on the machine by an operator.

Fig. 3 is a detail showing means for forming the wire into a hairpin shape.

Fig. 4 is a detail showing means for effecting cutting of the legs of the hairpin to required length.

Fig. 5 is a detail showing means for elevating the leg ends of the formed and cut wire to facilitate removal of the wire from the machine.

Fig. 6 is a wiring diagram of the motor control circuit of the machine, and

Fig. 7 is a fragmentary section of a table top showing a slot therethrough

Referring to the drawing in greater detail, at 10 there is disclosed a platform adapted to be raised above the floor in any convenient fashion. Fastened to the underside of the platform as by a flange 12 is a motor 14, the flange being fast with the motor frame. The shaft 16 of the motor extends above the platform and mounted on said extending end is a thick cam disc 18 whose hub 20 is fastened to the shaft end. The disc has in its upper surface a shallow groove 22 forming a cam track. Also on the upper surface, near the periphery of the disc, is a protuberance 24. On the peripheral surface of the disc is a second protuberance 26 and on the undersurface of the disc, near the periphery is a vertical cam surface 28. The functions of the groove, protuberances and vertical cam surface will be described later.

Spaced immediately above the cam disc is a table top 30, this top being spaced from the platform by posts 32, suitably secured to the platform and top by Allen screws 34 or the like. Parts are shown in broken relation with the platform and table top widely displaced vertically with respect to one another, but actually the top 30 is placed as close to platform 10 as the cam disc 18 permits.

Fastened to the upper surface of the table top 30 as by screws 36 is a rectangular block 38 recessed midway of its rear edge as indicated at 39. At an edge of block 38, see Fig. 1, is a guide plate 40 fastened to the block in any suitable fashion. This guide plate has slidably retained in cross channels thereof a pair of indicator fingers 42 having bevelled ends 44 with the longer sides of the fingers opposed to one another. Extending upwardly from the upper surface of block 38 is a locating rib 46 aligned with an elongated mandrel 48 these being midway of and parallel to the fingers 42. The rib 46 lies in the space between the fingers, as seen in Fig. 2 and assists the operator in determining the initial position of a wire to be processed. The operator should lay the wire on the block 38, as near as can be judged by the eye and by the aid of fingers 42 and rib 46, so that the wire extends equally on both sides of the rib 46, between the rib and mandrel and against the ends of fingers 42. In the case of coiled wires to become heaters in electron tubes, the wires may have distinctive central portions, as indicated at 50, which would be laid directly between the rib 46 and mandrel 48.

Attached to the top 30 is a pair of ways 52 bridged by a cover plate 54, the ways being parallel with the elongated mandrel 48, equally disposed on each side thereof and abutting the plate 40. The fingers 42 previously described may be integral with the ways and formed as continuations of the top surface of the ways, as shown in Fig. 1. Movable in the ways is a slide 56 carrying at its front end a bending tool in the form of a tongue 58, said tongue being slidable in a guide 60, see Fig. 2, within the plate 40. The tongue has a slotted end 62 adapted to loosely straddle the rib 46 and mandrel 48 as the tongue is moved upwardly and to the right in Fig. 1 and to bend a wire which has been laid across the fingers into the form of hairpin, as shown in Fig. 3. To shift the slide 56 there is fastened to the same a vertical, laterally shiftable rod 64 slidable in a slot 65 in the top 30 and having a roller 66 at its lower end riding in the cam disc groove 22. In the process of bending the wire, the slotted end causes the wire to bend about the mandrel bringing the free ends of the wire over and beyond the recessed end 39 of the block 38. In the recessed end of the block is a removable cutter piece 68 carrying a stationary carbide cutter blade 70. Cooperating with the stationary blade is a second, movable carbide cutter blade 72 removably secured to an overhanging arm 74 on a vertically reciprocatable post 76 slidable in a slot in top 30 and confined against lateral movement by a strap 78 across the slot. The opening in the top 10 between the strap and the cutter piece 68 and blade 70 allows for dropping of the cut off ends of the wires through the opening. The lower end of the post 76 has a horizontal arm 80 supporting an antifriction roller 82 positioned to be engaged by the cam 28 in the rotation of the cam disc and to force the post and movable cutter blade downwardly against the force of a restoring tension spring 84 fastened at its opposite ends to the post and the underside of top 30. Thus for each cycle of operation, the cam groove in disc 18 will cause the slide to bend the wire into hairpin form and, because of the position of cam 28 with respect to the long axis of the cam groove 22, at the end of bending movement of the wire, the cutter blades will chop off the ends of the wire, as indicated in Fig. 4. Parts are so designed that the cam disc will coast to a stop as shown in the Fig. 1 position. At this time the protuberance 24 will cam itself under and lift to a slight extent a wire displacing rod 86, the upper end of which is flush with the top 30 during cam disc rotation but slightly raised above said top as shown in Fig. 1 and 5 when the protuberance 24 is beneath the rod. The rod is preferably angular in cross section and is movable through a conforming guide bore in the table top 30 and is of a size sufficient to straddle the width of the legs of the hairpin as will be seen in Fig. 3. The parts will coast to a stop after the protuberance 26 has engaged the antifriction roller 99 on a switch arm 90 of the normally closed, momentarily opened, limit switch 100 and coasted through beyond such engagement. The momentary opening of the limit switch stops the operation of motor 14, as will be described.

The limit switch may be a microswitch in series with a self locking relay 102 within a case 104 beneath the treadle 106 of a foot operated switch 108. The contacts of switch 108 shunt the relay contacts. With parts as in Figs. 1 and 5, the motor is unenergized. When the treadle operated contacts are closed by depression of the treadle, a series circuit is established from the line, through the motor 14, now closed microswitch 100, the contacts of switch 108, the coil of relay 102 and the opposite side of the line. Once current is established in the relay 102, the movable contact is pulled up locking the relay in the circuit, regardless of the position of the treadle. Therefore, only a momentary depression of treadle 106 is necessary to start the machine into operation. This operation of the machine continues while bending of the wire and cutting off the ends occur. Then protuberance 26 momentarily flicks the microswitch open and coasts by. At the end of the coasting operation the protuberance 24 engages and lifts the rod 86. If desired the protuberance 24 may be elongated arcuately of the cam disc to take care of a variable degree of coasting of the disc. The momentary opening of the microswitch allows the contacts of relay 102 to drop out, cutting off the current to the motor, the operator's foot having been previously removed from the treadle.

Having described the invention, what is claimed is:

1. A wire bending and cutting machine comprising a table top, an elongated mandrel on said top, a bending tool movable on an axis parallel to the elongation of the mandrel and having portions straddling the mandrel in one position of the tool, a pair of cooperating cutter blades positioned beyond the mandrel, a reciprocatable member supporting one of the blades, a wire lifting rod reciprocatable through the table and normally having its upper end flush with the table top and beneath the bent ends of the wire, rotatable cam mechanism and motor means to rotate the same, means limiting the rotation of the cam mechanism to one cycle of operation, and means connecting the cam mechanism with the bending tool, the reciprocatable blade supporting member and the wire lifting rod to reciprocate all three.

2. Means for folding and cutting wire ends from a folded wire comprising a table top, an elongated mandrel on said top, a wire bending tongue having bifurcated ends adapted to be moved toward and into straddling relationship with said mandrel and to a position removed from said mandrel, a wire cutting mechanism including a vertically reciprocatable post carrying a cutter blade, a cam disc for reciprocating both the tongue and the blade, said disc having a horizontal cam groove in its upper face and a vertical cam face on its lower face, means interconnecting the tongue and groove including a vertical rod whose lower end rides in the groove and whose upper end is operably connected to the tongue, means at the lower end of the post to be engaged by the vertical cam to lower the blade, and means to raise the post.

3. Means for folding and cutting wire ends from a folded wire comprising a table top, an elongated mandrel on said top, a wire bending tongue having bifurcated ends adapted to be moved toward and into straddling relationship with said mandrel and to a position removed from said mandrel, a wire cutting mechanism including a vertically reciprocatable post carrying a cutter blade, a cam disc for reciprocating both the tongue and the blade, said disc having a horizontal cam groove in its upper face and a vertical cam face on its lower face, means interconnecting the tongue and groove including a vertical rod whose lower end rides in the groove and whose upper end is operably connected to the tongue, means at the lower end of the post to be engaged by the vertical cam to lower the blade, means to raise the post, a third cam on the upper surface of the disc and a rod extending through the top and beneath the ends of a bent wire on said top in position to be engaged and lifted by said third cam.

References Cited in the file of this patent

UNITED STATES PATENTS

| | | |
|---|---|---|
| 319,206 | Dodge | June 2, 1885 |
| 1,388,409 | Darling | Aug. 23, 1921 |
| 1,606,760 | Griffith | Nov. 16, 1926 |
| 1,930,329 | Vinar | Oct. 10, 1933 |
| 2,549,061 | Dauenhauer | Apr. 17, 1951 |
| 2,789,585 | Bank et al. | Apr. 23, 1957 |
| 2,799,337 | Arcus | July 16, 1957 |